US006725122B2

(12) United States Patent
Mori et al.

(10) Patent No.: US 6,725,122 B2
(45) Date of Patent: Apr. 20, 2004

(54) DEVICE AND METHOD OF SELECTING PHOTOMASK MANUFACTURER BASED ON RECEIVED DATA

(75) Inventors: Masayoshi Mori, Hyogo (JP); Yuko Kikuta, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 28 days.

(21) Appl. No.: 09/962,218

(22) Filed: Sep. 26, 2001

(65) Prior Publication Data

US 2002/0143424 A1 Oct. 3, 2002

(30) Foreign Application Priority Data

Mar. 28, 2001 (JP) ....................................... 2001-091793

(51) Int. Cl.[7] ................................................ G06F 19/00
(52) U.S. Cl. ............................ 700/121; 700/97; 705/26
(58) Field of Search ............................ 700/121, 97, 99, 700/116–117; 705/26, 37

(56) References Cited

U.S. PATENT DOCUMENTS

| | | | | | |
|---|---|---|---|---|---|
| 4,992,940 | A | * | 2/1991 | Dworkin | 705/26 |
| 5,450,332 | A | * | 9/1995 | Criscuoli et al. | 716/21 |
| 6,110,213 | A | * | 8/2000 | Vinciarelli et al. | 703/1 |
| 6,336,056 | B1 | * | 1/2002 | Fujimoto et al. | 700/121 |
| 6,415,195 | B1 | * | 7/2002 | Gleditsch et al. | 700/99 |
| 2001/0037341 | A1 | * | 11/2001 | Kimoto et al. | 707/104.1 |
| 2002/0004686 | A1 | * | 1/2002 | Chiba | 700/97 |
| 2002/0007293 | A1 | * | 1/2002 | Clemens et al. | 705/7 |
| 2002/0123943 | A1 | * | 9/2002 | Gupta et al. | 705/28 |
| 2002/0128946 | A1 | * | 9/2002 | Chehade et al. | 705/37 |
| 2002/0138404 | A1 | * | 9/2002 | Akiyama et al. | 705/37 |
| 2003/0056189 | A1 | * | 3/2003 | Miyazaki et al. | 716/19 |
| 2003/0074274 | A1 | * | 4/2003 | Kyoh et al. | 705/26 |
| 2003/0177469 | A1 | * | 9/2003 | Suttile et al. | 716/21 |

FOREIGN PATENT DOCUMENTS

| | | |
|---|---|---|
| JP | 9-180980 | 7/1997 |
| JP | 11-31179 | 2/1999 |

OTHER PUBLICATIONS

Chiba, "Apparatus for assisting placing order for manufacturing semiconductor device" US PG Pub 2002/0004686 A1 Pub. date Jan. 10, 2002, Foreign Priority date Jun. 30, 2000 (JP).*

Kazuhiro, "Semiconductor Manufacturing System" Translated Japanese Patent 09–180980 Jul. 11, 1997.*

* cited by examiner

*Primary Examiner*—Leo Picard
*Assistant Examiner*—Alexander Kosowski
(74) *Attorney, Agent, or Firm*—McDermott, Will & Emery

(57) ABSTRACT

A method of selecting a photomask manufacturer includes the steps of storing bidding data sent from a photomask manufacturer, correcting a responded delivery date included in the received bidding data to a corrected delivery date based on a delivery date achieving ratio in a last month, storing priorities relating to a delivery date, technology, order reception and price, reading the corrected delivery date for each of the manufacturers making a bid for a product number to be ordered when the product number is input, calculating total evaluation for each photomask manufacturer based on the plurality of priorities, and selecting the photomask manufacturer satisfying the corrected delivery date and providing the highest result of total evaluation, as the receiver of the order.

18 Claims, 16 Drawing Sheets

FIG.10

BIDDING DATA MANUFACTURER'S COMPUTER → SERVER

| HEADER | NAME OF PHOTOMASK MANUFACTURER | PRODUCT NUMBER | RESPONDED DELIVERY DATE | RESPONDED PRICE |
|---|---|---|---|---|

FIG.11

ORDER DATA SERVER → MANUFACTURER'S COMPUTER

| HEADER | NAME OF PHOTOMASK MANUFACTURER | PRODUCT NUMBER | QUANTITY | ORDER DATE | REQUESTED DELIVERY DATE |
|---|---|---|---|---|---|

FIG.12

| PRODUCT NUMBER | QUANTITY | SCHEDULED ORDER DATE | REQUESTED DELIVERY DATE | COMMENTS |
|---|---|---|---|---|
| M1S | 200 | 2001/03/01 | 2001/03/30 | |
| M2S | 150 | 2001/03/10 | 2001/03/15 | |
| M3S | 150 | 2001/03/20 | 2001/04/20 | |
| M4S | 200 | 2001/03/15 | 2001/03/16 | URGENT |
| M5S | 300 | 2001/03/20 | 2001/03/30 | |
| ... | ... | ... | ... | ... |

FIG.13

| PRODUCT NUMBER | PHOTOMASK SPECIFICATIONS | | | | | | | | | |
|---|---|---|---|---|---|---|---|---|---|---|
| | DATA FILE NAME | SUBSTRATE SIZE | SHIELD FILM | ADDRESS UNIT | ELEMENT SIZE ACCURACY | DEFECT SIZE | DEFECT DENSITY | DESIGN RULE | PATTERN FORM | ... |
| M1S | | | | | | | | | | |
| M2S | | | | | | | | | | |
| M3S | | | | | | | | | | |
| M4S | | | | | | | | | | |
| M5S | | | | | | | | | | |
| ... | | | | | | | | | | |

FIG.14

| PRODUCT NUMBER | MANUFACTURER NAME | DELIVERY SITUATION IN LAST MONTH (2000/02) | | | | DELIVERY PRIORITY |
|---|---|---|---|---|---|---|
| | | ORDER DATE | REQUESTED DELIVERY DATE | DELIVERY DATE | DELIVERY DATE ACHIEVING RATIO (RESULT) | |
| M1S | X | 2001/02/03 | 2001/02/14 | 2001/02/15 | 50 | 50 |
| | Y | 2001/02/13 | 2001/02/14 | 2001/02/14 | 80 | 80 |
| | Z | 2001/02/25 | 2001/02/28 | 2001/02/26 | 100 | 100 |
| | W | 2001/02/20 | 2001/02/28 | 2001/02/28 | 80 | 80 |
| M2S | X | ... | ... | ... | ... | ... |
| | Y | ... | ... | ... | ... | ... |
| | Z | ... | ... | ... | ... | ... |
| | W | ... | ... | ... | ... | ... |
| M3S | X | ... | ... | ... | ... | ... |
| | Y | ... | ... | ... | ... | ... |
| | Z | ... | ... | ... | ... | ... |
| | W | ... | ... | ... | ... | ... |
| ... | ... | ... | ... | ... | ... | ... |

FIG.15

| MANUFACTURER | TECHNOLOGY PRIORITY | PRIORITY DETERMINING FACTORS (10 POINTS X 10 ITEMS) | | | | | | | | | |
|---|---|---|---|---|---|---|---|---|---|---|---|
| | | ADDRESS | NUMBER OF DEVICES | DEVICE TYPE | DATA PROCESSING TECHNOLOGY | PROBLEM HANDLING | EXPORT | COOPERATIVE MANUFACTURER | SUBSTRATE MANUFACTURING TECHNOLOGY | ... | ... |
| X | 100 | | | | | | | | | | |
| Y | 100 | | | | | | | | | | |
| Z | 80 | | | | | | | | | | |
| W | 50 | | | | | | | | | | |
| ... | ... | | | | | | | | | | |

FIG.16

| MANUFACTURER NAME | PLANNED QUANTITY 2000/03 | ACTUAL QUANTITY | SCHEDULED QUANTITY | (PLANNED QUANTITY) − ((ACTUAL QUANTITY) + (SCHEDULED QUANTITY)) | ORDER RECEPTION PRIORITY |
|---|---|---|---|---|---|
| X | 60 | 30 | 25 | 5 | 100 |
| Y | 110 | 100 | 10 | 0 | 75 |
| Z | 70 | 50 | 30 | −10 | 25 |
| W | 90 | 90 | 10 | −10 | 25 |
| ... | ... | ... | ... | ... | ... |

FIG.17

| PRODUCT NUMBER | REQUESTED DELIVERY DATE | MANUFACTURER NAME | RESPONDED DATE | RESPONDED PRICE | CORRECTED DATE | PRICE PRIORITY |
|---|---|---|---|---|---|---|
| M1S | 2001/03/30 | X | 2001/03/30 | ¥1,000,000 | 2001/04/01 | 75 |
| | | Y | 2001/03/28 | ¥1,100,000 | 2001/03/28 | 50 |
| | | Z | 2001/03/27 | ¥1,150,000 | 2001/03/27 | 25 |
| | | W | 2001/03/15 | ¥900,000 | 2001/03/15 | 100 |
| M2S | 2001/03/15 | X | ... | ... | ... | ... |
| | | Y | ... | ... | ... | ... |
| | | Z | ... | ... | ... | ... |
| | | W | ... | ... | ... | ... |
| M3S | 2001/04/20 | X | ... | ... | ... | ... |
| | | Y | ... | ... | ... | ... |
| | | Z | ... | ... | ... | ... |
| | | W | ... | ... | ... | ... |
| ... | ... | ... | ... | ... | ... | ... |

FIG.18

| PRODUCT NUMBER | MANUFACTURER NAME | DELIVERY PRIORITY (WEIGHT = 0.40) | TECHNOLOGY PRIORITY (WEIGHT = 0.35) | ORDER RECEPTION RIORITY (WEIGHT = 0.15) | PRICE PRIORITY (WEIGHT = 0.10) | TOTAL EVALUATION |
|---|---|---|---|---|---|---|
| M1S | X | 50 | 100 | 100 | 75 | 77.5 |
| | Y | 80 | 100 | 75 | 50 | 83.3 |
| | Z | 100 | 80 | 25 | 25 | 74.3 |
| | W | 80 | 50 | 25 | 100 | 63.3 |
| M2S | X | ... | ... | ... | ... | ... |
| | Y | ... | ... | ... | ... | ... |
| | Z | ... | ... | ... | ... | ... |
| | W | ... | ... | ... | ... | ... |
| ... | ... | ... | ... | ... | ... | ... |

| PRODUCT NUMBER | MANUFACTURER NAME | QUANTITY | ORDER DATE | REQUESTED DELIVERY DATE |
|---|---|---|---|---|
| M1S | Y | 100 | 2001/03/01 | 2001/03/30 |
| M2S | X | 25 | 2001/03/01 | 2001/03/30 |
| M3S | X | 30 | 2001/03/03 | 2001/03/15 |
| M4S | W | 110 | 2001/03/03 | 2001/03/15 |
| M5S | X | 20 | 2001/03/02 | 2001/03/16 |
| ... | ... | ... | ... | ... |

DEVICE AND METHOD OF SELECTING PHOTOMASK MANUFACTURER BASED ON RECEIVED DATA

BACKGROUND OF THE INVENTION

1. Field of the Invention

The present invention relates to an order system for semiconductor devices, and particularly to a system for selecting a manufacturer of a photomask, which is a master of wafers for semiconductor devices.

2. Description of the Background Art

Conventionally, manufacturers of IC (Integrated Circuit) chips manufacture various kinds of IC chips in accordance with requests by customers. In these IC chips, interconnection patterns change when the customer changes the requested specifications. In a manufacturing step of the IC chip, the interconnection pattern is to be formed. As a master, the above processing uses a photomask, in which a light shield pattern formed of a thin metal film is arranged on a substrate. This photomask is ordered to a photomask manufacturer from the IC chip manufacturer, and is manufactured by the photomask manufacturer.

Information relating to the specifications of the photomask is sent from the orderer, i.e., IC chip manufacturer to the receiver of the order, i.e., a photomask manufacturer in the form of data stored in a magnetic tape or via an online system. The photomask manufacturer produces manufacturing data for the photomask based on the information relating to the received specifications. In addition to this, order information relating to a quantity of photomasks, a requested-date of delivery and others is sent from the IC chip manufacturer to the photomask manufacturer via a telephone or online.

Based on the order information, the photomask manufacturer prepares information (manufacturing priority, product number, quantity, delivery destination, delivery date and others) as well as management data including information required for quality management. The prepared management data is sent to the photomask production line. The photomask production line produces the photomasks based on the manufacturing data and management data. The photomasks are produced by an electron beam exposing device, which is controlled in accordance with the manufacturing data.

Japanese Patent Laying-Open No. 9-180980 has disclosed the foregoing type of manufacturing system for the IC chips. In this IC chip manufacturing system, an interconnection pattern is changed in accordance with specifications required by a customer. The system includes an input terminal, a processing unit and a production line. The input terminal is used by customers purchasing the IC chips. The input terminal includes an input circuit for entering the information such as specifications and quantity of IC chips requested by the customer. The processing unit includes a preparing circuit, which operates based on the information entered through the input terminal to prepare data required for an exposing step and data required for production management and quality management of the IC chip, and also includes a transmission circuit for transmitting the data prepared by the preparing circuit to the production line. The production line produces the IC chips in accordance with the data transmitted from the processing unit.

According to this system, the information relating to the specifications, quantity and others of the IC chips is input only through the input terminal, which is used only by the customers. Therefore, the information processing can be performed more quickly and easily than in the case where the information relating to the specifications, quantity and others of the IC chips is sent by various manners using magnetic tapes, telephone and others. As a result, the priorities of the customer's orders can be managed easily.

Although the above publication has disclosed the transmission of the data, which is prepared by the preparing circuit, to a photomask manufacturer in accordance with the priority, it has not disclosed details of the priority. An IC chip manufacturer orders a photomask to a mask manufacturer, which is determined based on many factors. In the process of producing IC chips, the delivery date and quality of the photomask significantly affect the delivery date and quality of the IC chips. Therefore, it is not easy to select a specific one from many manufacturers of the photomask, which significantly affects the delivery date and quality of the IC chips. Based on human's determination, appropriate selection of the photomask manufacturer may be difficult.

SUMMARY OF THE INVENTION

An object of the invention is to provide a selecting device for appropriately selecting a photomask manufacturer for production of a photomask as well as a method for the same.

Another object of the invention is to provide a selecting device for appropriately selecting a photomask manufacturer for production of a photomask based on information sent from the photomask manufacturer as well as a method for the same.

Still another object of the invention is to provide a selecting device for appropriately selecting a photomask manufacturer capable of delivering before a due date as well as a method for the same.

Yet another object of the invention is to provide a selecting device for appropriately selecting a photomask manufacturer, which can achieve a high quality of the photomask, as well as a method for the same.

Further another object of the invention is to provide a selecting device for appropriately selecting a photomask manufacturer based on a plurality of factors as well as a method for the same.

A selecting device according to the invention is a device for selecting a manufacturer of a photomask. The selecting device includes a communication circuit that communicates with a computer of a manufacturer of the photomask, a storage circuit that stores data, and a control circuit connected to the communication circuit and the storage circuit for controls the communication circuit and the storage circuit. The control circuit includes a circuit that sends specification data including specifications of the photomask and a requested delivery date to the computer, a circuit that receives estimation data and stores the same in the storage circuit, a circuit that stores delivery data representing results of delivery of the photomasks by the manufacturer in the storage circuit, a circuit that corrects the scheduled delivery date based on the scheduled delivery date and the results, and stores the scheduled and corrected delivery date in the storage circuit, and a select circuit that selects the manufacturer of the photomask based on the requested delivery date and the scheduled and corrected delivery date.

When the selecting device sends the specification data to the manufacturer's computer, the manufacturer, which receives the specification data, prepares the estimation data including the scheduled delivery date of the photomask based on the specifications and the requested delivery date.

The estimation data thus prepared is sent to the selecting device. The selecting device stores the results of delivery of the photomasks by the manufacturer, and calculates the corrected delivery date based on the delivery results and the scheduled delivery date. If a delay from a requested delivery date has occurred in the past, the corrected delivery date delayed by a predetermined amount from the scheduled delivery date is determined. The selecting device can select the manufacturer based on the corrected delivery date and the requested delivery date. Thereby, the photomask manufacturer can be selected based on the delivery date, which is the most important factor for selecting the photomask manufacturer.

More preferably, the select circuit includes a circuit that selects a plurality of manufacturers for manufacturing the photomask. The control circuit further includes a circuit that calculates a priority for the delivery date for each of the manufacturers based on the delivery data, and a circuit that selects the manufacturer of the photomask from the plurality of manufacturers selected by the select circuit based on the priority relating to the delivery date.

The selecting device calculates the priority relating to the delivery date for each of the manufacturers based on the delivery data, and can select, as the order receiver, the photomask manufacturer carrying the highest priority relating to the delivery date from the plurality of manufacturers selected by the select circuit. Thereby, the photomask manufacturer observing the requested delivery date is selected, and the photomasks can be delivered on or before the requested delivery date.

More preferably, the select circuit includes a circuit that selects a plurality of manufacturers for manufacturing the photomask. The control circuit further includes a circuit that receives technology data representing a technology of said manufacturer relating to manufacturing of the photomask from the computer, and stores the technology data in the storage circuit, a circuit that calculates a priority relating to the technology for each of the manufacturers based on the technology data, and a circuit that selects the manufacturer of the photomask from the plurality of manufacturers selected by the select circuit based on the priority relating to the technology.

The selecting device calculates the priority relating to the technology for each manufacturer based on the technology data, and can select, as the receiver of the order, the photomask manufacturer carrying the highest priority relating to the technology from the plurality of photomask manufacturers selected by the select circuit. Thereby, the photomask manufacturer having a high technology is selected, and the quality of the photomask can be increased.

More preferably, the select circuit includes a circuit that selects a plurality of manufacturers for the photomask. The control circuit further includes a circuit that calculates a priority relating to the delivery date for each of the manufacturers based on the delivery data, a circuit that receives technology data representing a technology of the manufacturer relating to production of the photomask from the computer, and stores the received technology data in the storage circuit, a circuit that calculates a priority relating to the technology for each of the manufacturers based on the technology data, and a circuit that selects the manufacturer of the photomask from the plurality of manufacturers selected by the select circuit based on the priorities relating to the delivery date and the technology.

The circuit that calculates the priority relating to the delivery date calculates the priority relating to the delivery date based on whether the results of delivery of photomasks contain a result of delay in delivery date or not. The circuit that calculates the priority relating to the technology calculates the priority relating to the technology based on the technology data representing the technology relating to the manufacturing of photomasks. The select circuit can select the manufacturer from the plurality of manufacturers based on the priorities relating to the delivery date and the technology calculated for each of the manufacturers. Thereby, the photomask manufacturer can be easily selected based on the plurality of factors.

A selecting method according to another aspect of the invention is a method of selecting a manufacturer of a photomask. The selecting method includes the steps of sending specification data including specifications of the photomask and a requested delivery date to a computer of the manufacturer; receiving and storing estimation data; preparing delivery data representing results of delivery of the photomask by the manufacturer; correcting the scheduled delivery data based on the scheduled delivery data and the result, and storing the corrected delivery data; and selecting the manufacturer of the photomask based on the requested delivery date and the corrected delivery date.

When the specification data is sent to the manufacturer's computer, the manufacturer, that receives the specification data prepares the estimation data including the scheduled delivery date of the photomask based on the specifications and the requested delivery date, and sends the prepared estimation data. The selecting method stores the results of delivery of the photomasks by the manufacturer, and calculates the corrected delivery date based on the delivery results and the scheduled delivery date. If a delay from a requested delivery date has occurred in the past, the corrected delivery date delayed by a predetermined amount from the scheduled delivery date is determined. The selecting method can select the manufacturer based on the corrected delivery date and the requested delivery date. Thereby, the photomask manufacturer can be selected based on the delivery date, which is the most important factor for selecting the photomask manufacturer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows bidding data sent from the photomask manufacturer's computer to the server;

FIG. 11 shows order data sent from the server to the photomask manufacturer's computer;

FIG. 12 shows order registration database stored in a fixed disk;

FIG. 13 shows specification database stored in the fixed disk;

FIG. 14 shows database of delivery date priorities stored in the fixed disk;

FIG. 15 shows database of technology priorities stored in the fixed disk;

FIG. 16 shows database of order reception priorities stored in the fixed disk;

FIG. 17 shows database of price priorities stored in the fixed disk;

FIG. 18 shows database of total evaluation stored in the fixed disk;

DESCRIPTION OF THE PREFERRED EMBODIMENTS

Embodiments of the invention will now be described with reference to drawings. In the following description and drawings, the same parts bear the same reference numbers and names, and also have the same functions. Therefore, description thereof will not be repeated where appropriate.

Figure 1:
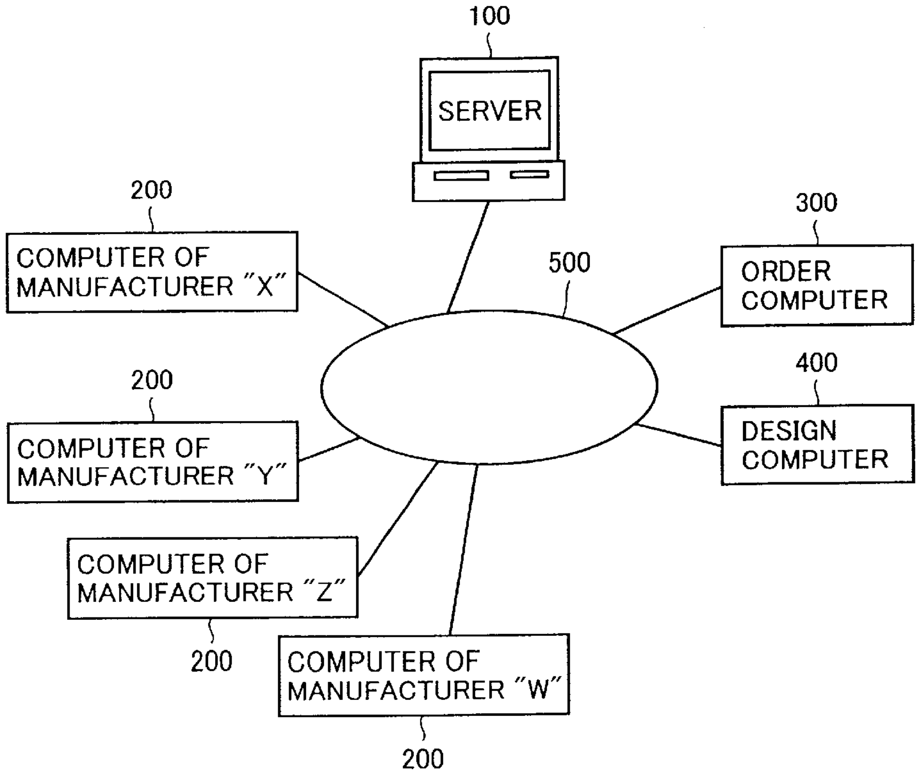
FIG. 1 shows a whole structure of a photomask manufacturer selecting system of an embodiment of the invention.

Referring to FIG. 1, a photomask manufacturer selecting system according to the invention includes a computer 200 of a photomask manufacturer producing photomasks, an order computer 300 for preparing order data of the photomasks, and sending it to a server 100, a design computer 400 which prepares design data of the photomasks, and sends it to server 100, and server 100 which is connected to these computers via a network 500. Computers 200 of a plurality of photomask manufacturers are connected to network 500.

Server 100 stores the data received from photomask manufacturer's computer 200. Server 100 has a function of selecting the photomask manufacturer, with which an order is to be placed, from the plurality of photomask manufacturers based on the stored data.

The photomask manufacturer selecting function of server 100 in the photomask manufacturer selecting system according to the invention is achieved by a predetermined program running on a CPU (Central Processing Unit) in the computer.

Figure 2:
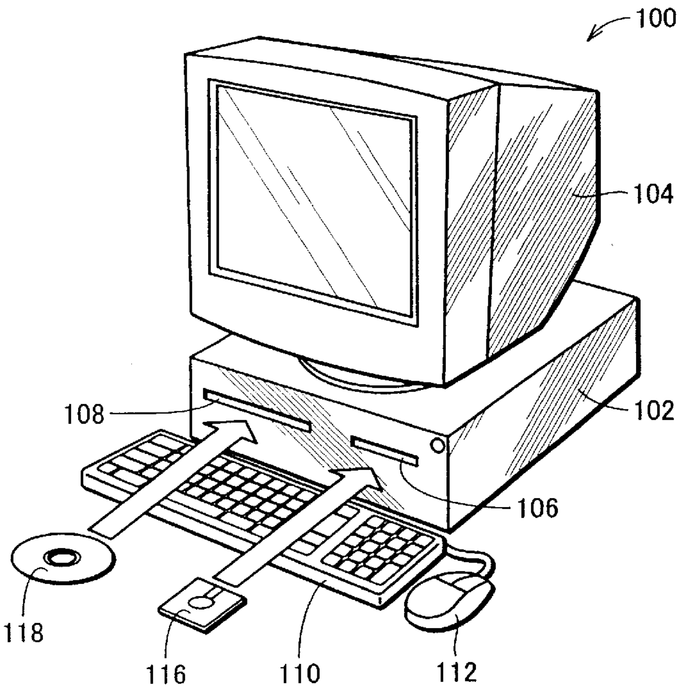
FIG. 2 shows an outer appearance of a computer that operates as a server.

FIG. 2 shows an outer appearance of a computer system, which is an example of server 100 achieving the photomask manufacturer selecting function. Referring to FIG. 2, the computer system includes a computer 102 provided with an FD (Flexible Disk) drive 106 and a CD-ROM (Compact Disc-Read Only Memory) drive 108, a monitor 104, a keyboard 110 and a mouse 112.

Figure 3:
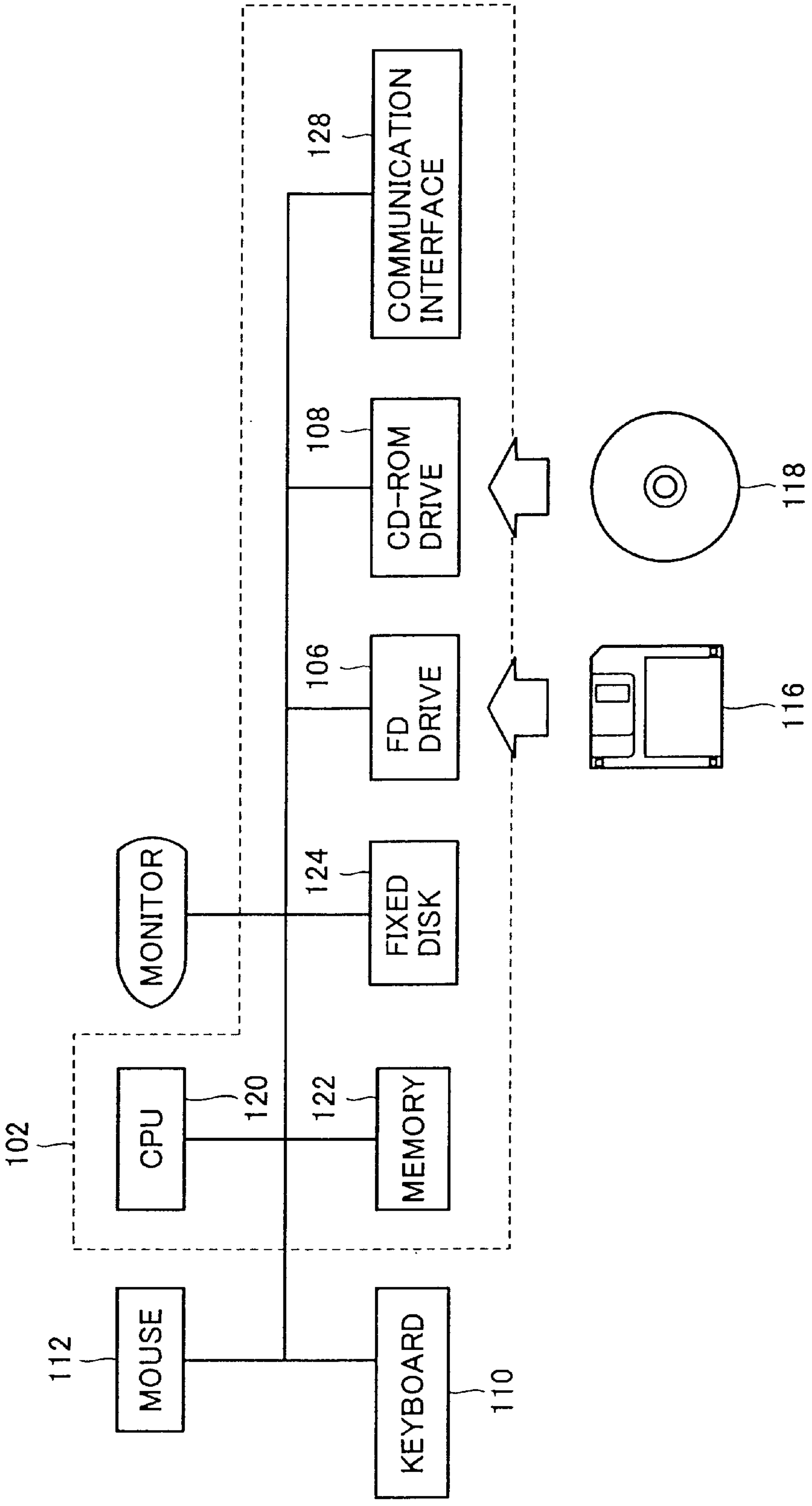
FIG. 3 is a control block diagram of the computer.

FIG. 3 is a block diagram showing a structure of this computer system. In addition to FD drive 106 and CD-ROM drive 108, as shown in FIG. 3, computer system 102 includes a CPU 120, a memory 122, a fixed disk 124 and a communication interface 128, which are mutually connected via a bus. Communication interface 128 is used for communication with other computers. An FD 116 is set in FD drive 106. A CD-ROM 118 is set in CD-ROM drive 108. These FD 116 and CD-ROM 118 store predetermined programs.

As already described, server 100 having the photomask manufacturer selecting function is achieved by the computer hardware and the software executed by CPU 120. This kind of software is generally stored as programs in record mediums such as FD 116 and CD-ROM 118 for distribution, and is read out from the record medium by FD drive 106 or CD-ROM drive 108. The program thus read is stored in fixed disk 124. Then, it is read out from fixed disk 124 to memory 122, and is executed by CPU 120.

The hardware itself of these computers is well known. The computer includes a control circuit including a CPU, a storage circuit, an input circuit, an output circuit and an OS (Operating System), and thus can satisfy requirements for executing the program. In the invention, this kind of computer functions as a photomask manufacturer selecting device.

Operations of the computer shown in FIGS. 2 and 3 are well known, and therefore specific description thereof is not repeated here.

Figure 4:
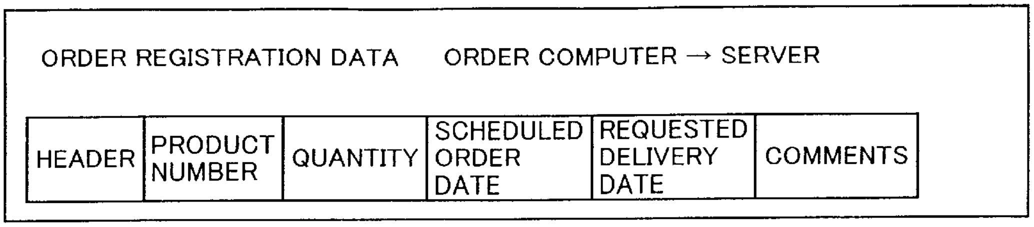
FIG. 4 shows order registration data sent from an order computer to the server.

Referring to FIG. 4, description will be given on order registration data sent from order computer 300 to server 100. The order registration data includes a header including a flag, which represents that this data is the order registration data, a product number of the photomask to be ordered, a quantity of the photomasks to be ordered, a scheduled order date, a requested delivery date and comments. The comments are data representing a specific requirement, e.g., "urgent order".

Figure 5:
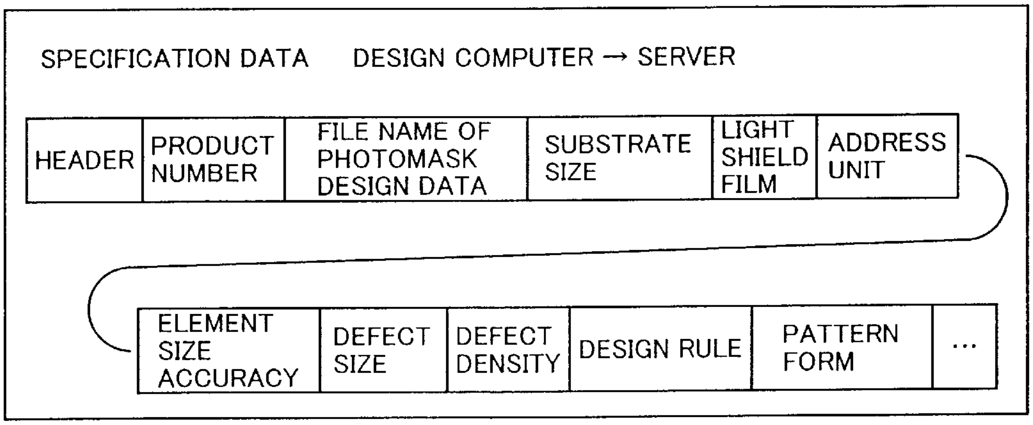
FIG. 5 shows specification data sent from a design computer to the server.

Referring to FIG. 5, description will now be given on the specification data sent from design computer 400 to server 100. The specification data includes a header including a flag, which represents that the data is specification data, a product number of the photomask, a file name of the mask design data, a substrate size, a light shield film, an address unit, an element size accuracy, a defect size, a defect density, a design rule and a pattern form.

Figure 6:
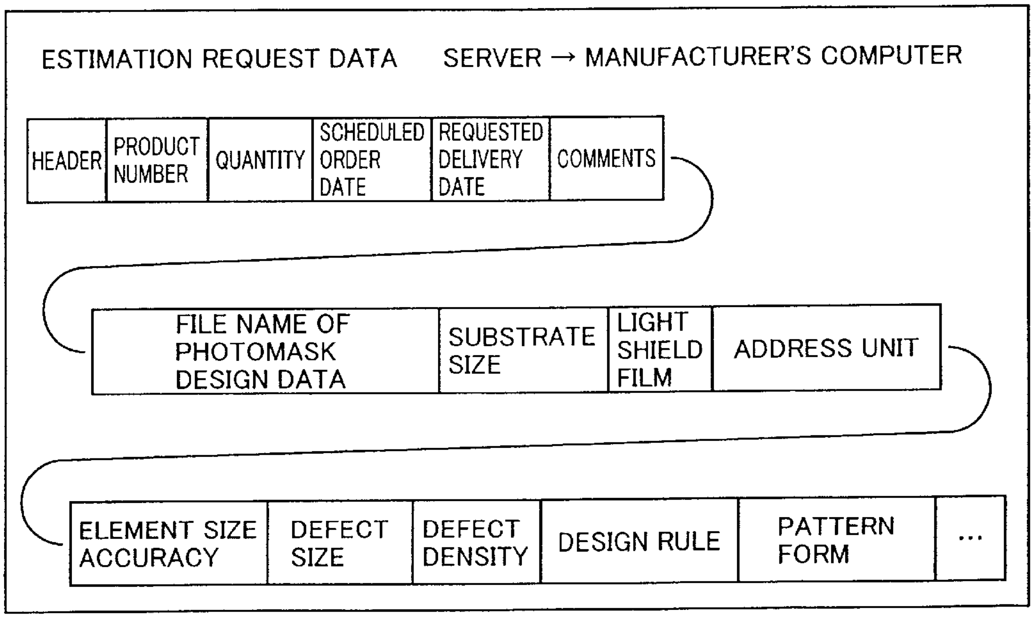
FIG. 6 shows estimation request data sent from the server to a photomask manufacturer's computer.

Referring to FIG. 6, description will now be given on estimation request data, which is sent from server 100 to photomask manufacturer's computer 200. The estimation request data includes a header including a flag, which represents that this data is estimation request data, the product number of the photomask relating to the estimation requested to the photomask manufacturer, the quantity, the scheduled order date, the requested delivery date, the comments, the file name of the mask design data, the substrate size, the light shield film, the address unit, the element size accuracy, the defect size, the defect density, the design rule and the pattern form. As shown in FIG. 6, the estimation request data includes information included in the order registration data (FIG. 4) and the information included in the specification data (FIG. 5).

The photomask manufacturer can determine a manufacturing device for the photomask, of which estimation is requested, based on the substrate size and others included in the estimation request data (FIG. 6). The photomask manufacturer can determine a measuring device for measuring the photomask, of which estimation is requested, based on the element size accuracy and others included in the estimation request data. The photomask manufacturer can determine an inspection device for inspecting the photomask, of which estimation is requested, based on the defect size and defect density included in the estimation request data.

Figure 7:
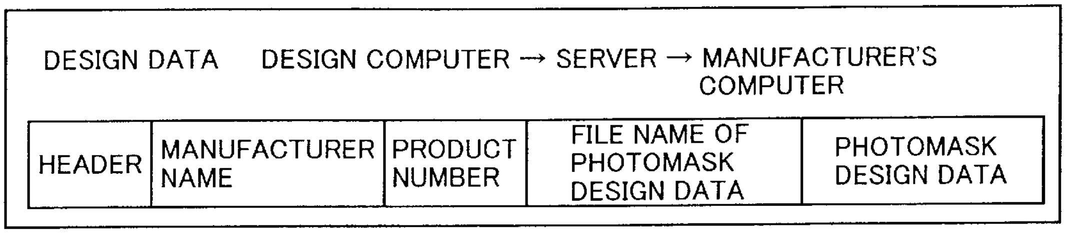
FIG. 7 shows design data sent from the design computer to the server and sent from the server to the photomask manufacturer's computer.

Referring to FIG. 7, description will now be given on the design data, which is sent from design computer 400 to server 100, and is sent from server 100 to computer 200 of the photomask manufacturer. The design data includes a header including a flag, which represents that the data is the design data, the name of the photomask manufacturer, the product number, the file name of the photomask design data and the mask design data.

Figure 8:
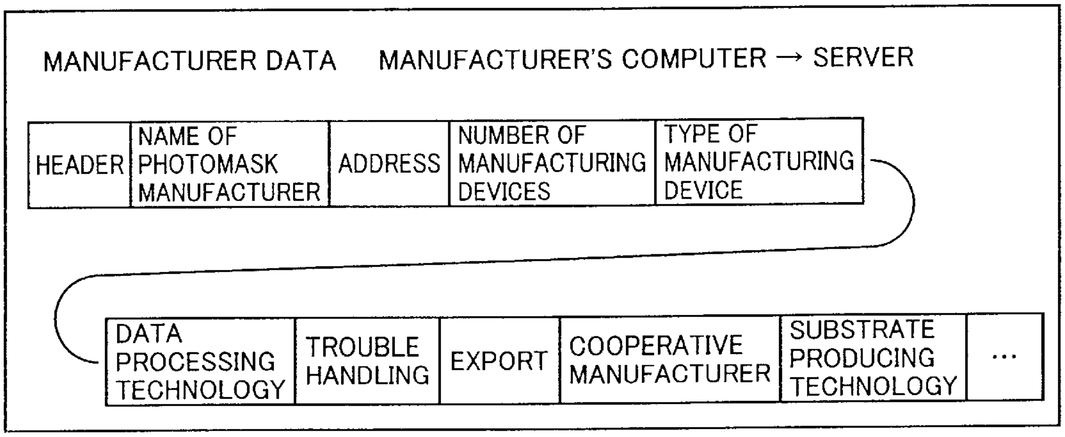
FIG. 8 shows manufacturer's data sent from the photomask manufacturer's computer to the server.

Referring to FIG. 8, description will now be given on the manufacturer data, which is sent from photomask manufacturer's computer 200 to server 100. The manufacturer data includes a header including a flag, which represents that the data is the manufacturer data, the name of photomask manufacturer, an address of the photomask manufacturer, a number of the manufacturing devices owned by the photomask manufacturer, a type(s) of the manufacturing devices owned by the photomask manufacturer, a data processing technology of the photomask manufacturer, a trouble handling method of the photomask manufacturer, data representing whether the photomask manufacturer has the ability for export or not, data relating to manufacturers for cooperation and a substrate producing technology of the photomask manufacturer.

Figure 9:
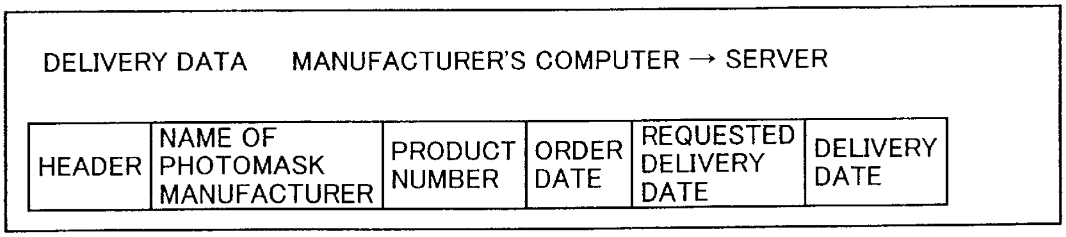
FIG. 9 shows delivery data sent from the photomask manufacturer's computer to the server.

Referring to FIG. 9, description will now be given on the delivery data, which is sent from photomask manufacturer's computer 200 to server 100. The delivery data includes a header including a flag, which represents that the data is the delivery data, the name of the photomask manufacturer, which has delivered the photomasks, the product number, the order date, the requested delivery date and the delivery date. The delivery data is sent to server 100 from the photomask manufacturer receiving the order data, which is shown in FIG. 11 and will be described later. The photomask manufacturer sends the delivery data to server 100 when the manufacturer, which received the order data and produced the photomasks in accordance with the specifications, delivers the photomasks to the orderer.

Referring to FIG. 10, description will now be given on bidding data, which is sent from photomask manufacturer's computer 200 to server 100. The bidding data includes a header including a flag, which represents that the data is the bidding data, the name of photomask manufacturer, the product number, the responded delivery date and the responded price. The photomask manufacturer determines a degree of production difficulty based on the specifications of the photomask included in the received estimation request data, and determines the price. The degree of production difficulty is calculated based on a yield corresponding to the specifications of photomask. The responded delivery date is calculated based on the yield, which depends on the specifications of the photomask included in the received estimation request data, and an operation time of devices used for the production. The devices used for production include a device for drawing a photomask pattern, a defect inspection device and an element size measuring device. The operation time is a sum of operations times of these drawing device, defect inspection device and element size measuring device.

Referring to FIG. 11, description will now be given on the order data sent from server 100 to photomask manufacturer's computer 200. The order data includes a header including a flag, which represents that the data is the order data, the name of photomask manufacturer, the product number, the quantity, the order date and requested delivery date. The order data is sent to the photomask manufacturer selected by server 100 from the photomask manufacturers, that has sent bidding data (FIG. 10). The photomask manufacturer, that has received the order data, recognizes the reception of the order for production of the photomask.

Referring to FIG. 12, description will now be given on the order registration database stored in fixed disk 124 of server 100, which achieves the photomask manufacturer selecting function according to the embodiment. The order registration database stores the quantity, the scheduled order date, the requested delivery date and the comments for each of the product numbers of the photomasks. The order registration database is prepared based on the order registration data (FIG. 4), which is sent from order computer 300 to server 100.

Referring to FIG. 13, description will now be given on the specification database stored in fixed disk 124. The specification database stores the photomask specifications for each of the product numbers of photomasks. The photomask specifications include the file name of photomask data, the substrate size, the light shield film, the address unit, the element size accuracy, the defect size, the defect density, the design rules and the pattern form. The specification database is prepared based on the specification data (FIG. 5), which is sent from design computer 400 to server 100. The photomask manufacturer can determine the specifications of the photomask pattern drawing device based on the substrate size, the light shield field and others in the photomask specifications, can determine the specifications of the element size measuring device based on the element size accuracy and can determine the specifications of the defect inspection device based on the defect size and defect density.

Referring to FIG. 14, description will now be given on the database of delivery date priority stored in fixed disk 124. The database of delivery date priority stores the delivery statistics in the last month and the delivery priority for each of the product numbers of photomasks and for each of the photomask manufacturers. The delivery statistics in the last month includes the photomask order dates, the requested delivery dates, the delivery dates, and the delivery dates achieving ratio calculated based on the requested delivery dates and delivery dates in the last month.

The calculated delivery date achieving ratio is equal to 100% if the delivery date (i.e., the actual delivery date) preceded the requested delivery date by two days, is equal to 90% if the delivery date preceded the requested delivery date by one day, is equal to 80% if the delivery date was the requested delivery date, is equal to 50% if the delivery date was delayed from the requested delivery date by one day, and is equal to 40% if the delivery date was delayed from the requested delivery date by two days. If the delivery date preceded the requested delivery date by three or more days, the calculated delivery date achieving ratio is equal to 100%. If the delivery date was delayed from the requested delivery date by three or more days, the calculated delivery date achieving ratio is equal to 40%.

The delivery date priority is set to be equal to the delivery date achieving ratio. For example, description will now be given on a product number "M1S" of the photomask and a photomask manufacturer "X". According to the delivery situation in the last month relating the product number "M1S" of the photomask manufacturer "X", the order date was Feb. 3, 2001, the requested delivery date was due on Feb. 14, 2001, and the actual delivery date was Feb. 15, 2001. Since the actual delivery date was delayed from the requested delivery date by one day, the calculated delivery date achieving ratio is equal to 50%, and the calculated delivery priority is 50%.

Referring to FIG. 15, description will now be given on the technology priority database stored in fixed disk 124. The technology priority database includes the technology priority and priority determining factors for each photomask manufacturer. The priority determining factors include 10 factors. Thus, the priority determining factors include a factor depending on the address of the photomask manufacturer, a factor depending on the number of manufacturing devices owned by the photomask manufacturer, a factor depending on the type(s) of the manufacturing devices owned by the photomask manufacturer, a factor depending on the data processing technology of the photomask manufacturer, a factor depending on the trouble handling method of the photomask manufacturer for the case where a problem is present in design data, a factor depending on whether the photomask manufacturer have the ability for export or not in the case where the photomask is produced for export, a factor depending on manufacturers for cooperation in the case where cooperation is performed for wafer production and a factor relating to a substrate producing technology of the photomask manufacturer. For each factor, points of up to 10 are determined.

For the factor relating to the address of photomask manufacturer, higher points are determined with decrease in transportation time from the photomask manufacturer to the delivery destination of the photomasks (i.e., the manufacturing factory of IC chips).

In connection with the factor relating to the number of manufacturing devices, different manufacturing devices may be required depending on the substrate sizes, light shield films and photomask processing, and the devices capable of production depend on the specifications of the photomasks. Therefore, higher points are assigned to the photomask manufacturer, which owns more manufacturing devices.

In connection with the factor relating to the kind of the manufacturing device, the quality of the photomask depends on the manufacturing device, and therefore higher points are assigned to the photomask manufacturer having the devices, which can produce the photomasks of higher quality.

In connection with the factor relating to the data processing technology, the manner of processing the design data for producing the photomask may be different between the photomask manufacturers. The finish accuracy of the element size depends on the data processing manner. Higher points are assigned to the photomask manufacturer having a better data processing technology.

In connection with the factor relating to the trouble handling, the manner and required time for handling a problem, which may be present in the design data sent to the photomask manufacturer, may be different between the photomask manufacturers. Higher points are assigned to the photomask manufacturer, which can analyze the contents of the problem and can handle it more quickly.

In connection with the factor relating to export, the photomasks may be used not only in the country but also outside the country, in which case higher points are assigned to the photomask manufacturer capable of better post-sales support outside the country.

In connection with the factor relating to the cooperating manufacturers, a plurality of IC chip manufacturers may cooperate to produce a single wafer, and the cooperating manufacturer(s) may designate the photomask manufacturer. Higher points are assigned to the photomask manufacturer, which has been designated as the cooperating manufacturer more times.

In connection with the factor relating to the substrate manufacturing technology, the photomask manufacturer may produce the substrate by itself. Such photomask manufacturer is superior in technology of substrate production, and therefore obtains higher points.

Two factors are present in addition to the above factors. Ten points are allotted to one factor for determining the technology priority. By summing the assigned points for 10 factors, the technology priority (on a scale of 100) is determined.

Referring to FIG. 16, description will now be given on an order reception priority database stored in fixed disk 124. The order reception priority database is prepared based on order plan database storing a planned order quantity and a scheduled order quantity, and the order data (FIG. 11) sent from server 100 to photomask manufacturer's computer 200.

As shown in FIG. 16, the order reception priority database stores, for each photomask manufacturer, the planned order quantity in a certain month, the actual order quantity in the same moth, the scheduled order quantity, ((planned order quantity)−((actual order quantity)+(scheduled order quantity))) and the order reception priority. The order reception priority is equal to 100 if ((planned order quantity)−((actual order quantity)+(scheduled order quantity))) is positive, is 75 if 0, and is 25 if negative. For the photomask manufacturer "X" in March 2000, the planned order quantity was 60, the actual order quantity was 30 and the scheduled order quantity was 25. According to the above formula, the result of calculation is 5. Therefore, the order reception priority of the photomask manufacturer "X" is 100. For the photomask manufacturer "W" in March 2000, the planned order quantity was 90, the actual order quantity was 90 and the scheduled order quantity was 10. According to the above formula, the result of calculation is −10. Therefore, the order reception priority of the photomask manufacturer "W" is 25.

This order reception priority increases as the sum of the actual order quantity and the scheduled order quantity falls below the planned order quantity by a larger extent, and decreases as the sum exceeds the planned order quantity to a larger extent. This order reception priority is determined for selecting the photomask manufacturer, with which the order is to be placed, so that the prepared order plan can be satisfied as fully as possible.

Referring to FIG. 17, description will now be given on the price priority database stored in fixed disk 124. The price priority database is prepared based on the bidding data (FIG. 10) sent from computer 200 of the photomask manufacturer to server 100. The price priority database stores the desired or requested delivery date for each product number. The price priority database stores the responded delivery date, responded price, corrected delivery date and price priority for each of the product numbers and each of the photomask manufacturers. The responded delivery date and the responded price correspond to the responded delivery date and the responded price included in the bidding data (FIG. 10).

The corrected delivery date is calculated by server 100 based on the responded delivery date. The corrected delivery date is calculated based on the delivery date achieving ratio in the delivery date priority database (FIG. 14). If the delivery date achieving ratio is 100%, 90% or 80%, the same date as the responded delivery date is calculated as the corrected delivery date. If the achieving ratio is 50%, the date delayed by two days from the responded delivery date is calculated as the corrected delivery date. If the achieving ratio is 40%, the date delayed by four days from the responded delivery date is calculated as the corrected delivery date.

The delivery date achieving ratios of photomask manufacturers "Y", "Z" and "W" shown in FIG. 17 are 80%, 100% and 80%, respectively. Therefore, the same date as the responded delivery date is calculated as the corrected delivery date. For the photomask manufacturer "X" shown in FIG. 17, the date of Apr. 1, 2001, which is delayed by two days from the responded delivery date Mar. 30, 2001, is calculated as the corrected delivery date, because the delivery date achieving ratio in the last month is 50%.

The price priority is calculated by sorting the photomask manufacturers, which have submitted the bidding data for one product number of the photomask, in ascending order of the responded prices, and the price priorities are determined in accordance with the result of the sort. For the photomask of the product number "M1S", as shown in FIG. 17, the bidding data has been received from the four manufacturers, and the price priorities of 100, 75, 50 and 25 are determined in accordance with the ascending order of the responded prices.

Referring to FIG. 18, description will now be given on the total evaluation database stored in fixed disk 124. The total evaluation database is prepared based on the delivery date priority database (FIG. 14), technology priority database (FIG. 15), order reception priority database (FIG. 16) and price priority database (FIG. 17). The total evaluation is calculated by adding the delivery date priority, the technology priority, order reception priority and the price priority with weights. For example, the weights of the delivery date priority, technology priority, and price priority are set to 0.40, 0.35, 0.15 and 0.10, respectively. As a result, the total evaluation for the product number "M1S" of the photomask manufacturer "X" is determined as 77.5. For the same product number "M1S", the total evaluation of the photomask manufacturer "Y" is determined as 83.8, the total evaluation of the photomask manufacturer "Z" is determined as 74.3, and the total evaluation of the photomask manufacturer "W" is determined as 63.3. Consequently, the manufacturer of the highest order reception priority for the product number "M1S" is determined as the photomask manufacturer "Y".

Figures 19, 20:
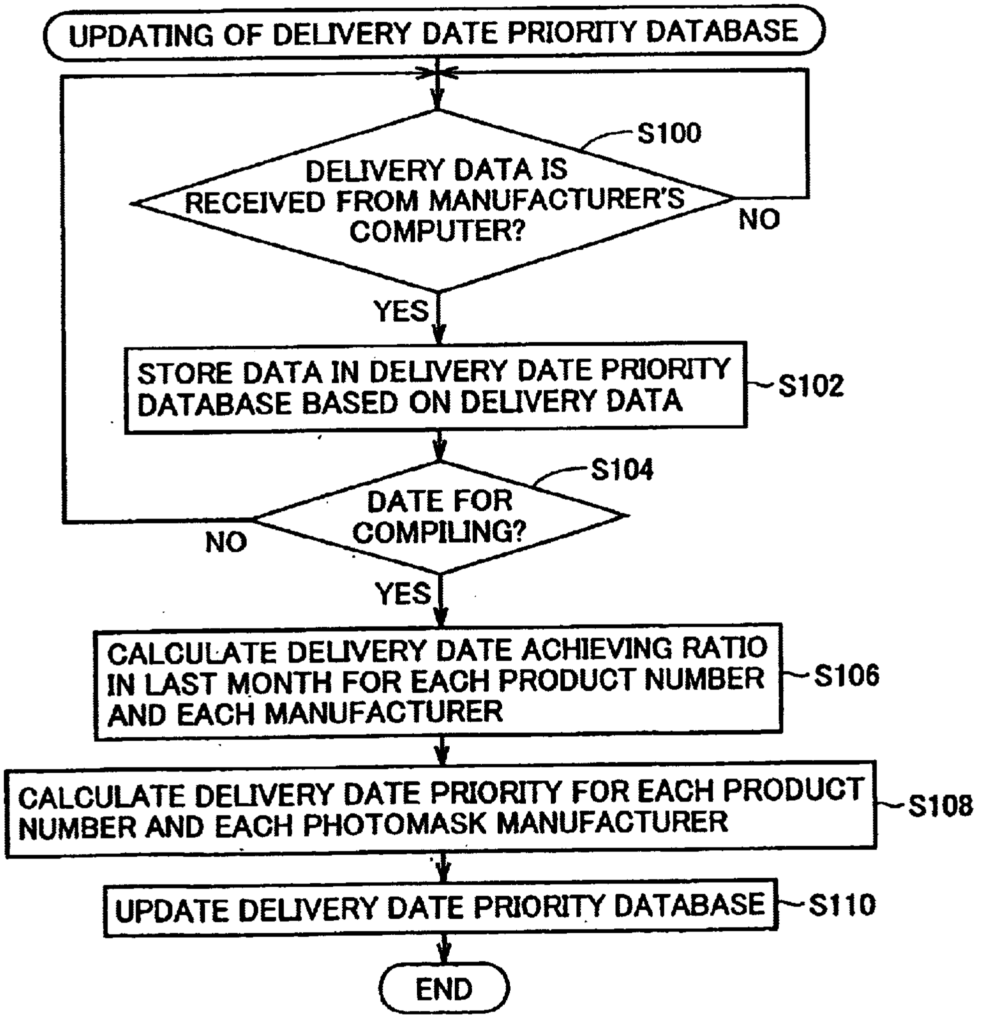
FIG. 19 shows database of order priorities stored in the fixed disk.
FIG. 20 is a flowchart showing processing of updating database of delivery date priorities in an embodiment of the invention.

Referring to FIG. 19, description will now be given on the order database stored in fixed disk 124. The order database stores, for each product number of the photomask, the photomask manufacturer, which received the order for the product number, the order quantity, the order data and the requested delivery date.

Referring to FIG. 20, the program executed by server 100 has the following control structure for the processing of updating the delivery date priority database.

In a step 100, (a step is hereinafter abbreviated as S) CPU 120 determines whether the delivery data (FIG. 9) is received from photomask manufacturer's computer 200 or not. If the delivery data is received from photomask manufacturer's computer 200 (YES in S100), the processing moves to S102. If not (NO in S100), the processing returns to S100 for waiting for the reception of the order data from manufacturer's computer 200.

In S102, CPU 120 stores predetermined data in the delivery date priority database (FIG. 14) based on the delivery data received in S100. In S104, CPU 120 determines whether the current-date and time have arrived at the date and time for compiling the delivery date priority database or not. If arrived at the date and time for compiling the delivery date priority database (YES in S104), the processing moves to S106. If not (NO in S104), the processing returns to S100 for further waiting for the reception of delivery data.

In S106, CPU 120 calculates the delivery date achieving ratio in the last month for each product number and each photomask manufacturer. In S108, CPU 120 calculates the delivery date priority for each product number and each photomask manufacturer.

In S110, CPU 120 updates the delivery date priority database (FIG. 14) based on the delivery date achieving ratio and the delivery date priority thus calculated.

Figure 21:
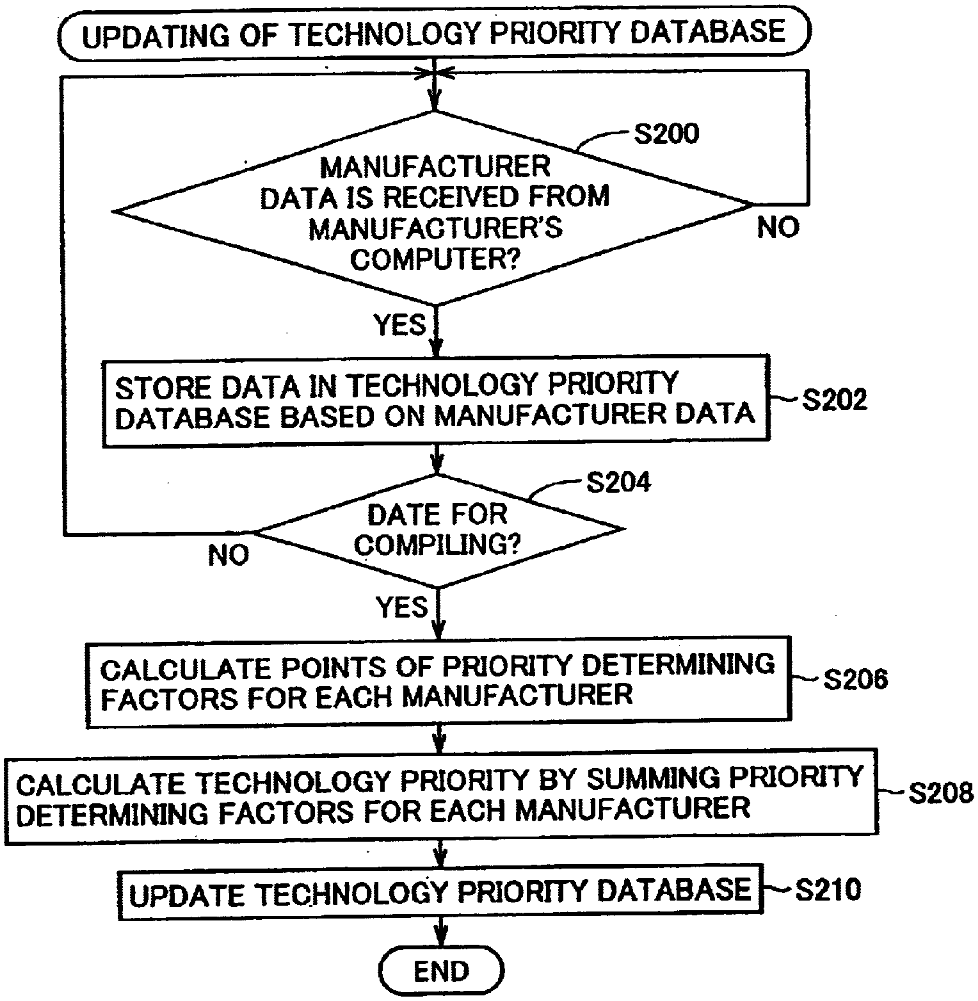
FIG. 21 is a flowchart showing processing of updating database of technology priorities in the embodiment of the invention.

Referring to FIG. 21, the program executed by server 100 has the following control structure for the processing of updating the technology priority database.

In S200, CPU 120 determines whether the manufacturer data (FIG. 8) is received from photomask manufacturer's computer 200 or not. If the manufacturer data is received from photomask manufacturer's computer 200 (YES in S200), the processing moves to S202. If not (NO in S200), the processing returns to S200 for waiting for the reception of manufacturer data from photomask manufacturer's computer 200.

In S202, CPU 120 stores predetermined data in the technology priority database (FIG. 15) based on the received manufacturer database.

In S204, CPU 120 determines whether the current date and time have arrived at the date and time for compiling the technology priority database or not. If arrived at the date for compiling the technology priority database (YES in S204), the processing moves to S206. If not (NO in S204), the processing returns to S200 for waiting for the reception of manufacturer data from manufacturer's computer 200.

In S206, CPU 120 calculates the points of the priority determining factors for each photomask manufacturer. Calculation is performed to determine the points (0–10) for each of the priority determining factors shown in FIG. 15. This calculation is performed based on a point table for each of the priority determining factors, which are stored separately from the forgoing data and others. In S208, CPU 120 calculates the technology priority, which is the sum of the calculated points of the respective priority determining factors. In S210, CPU 120 updates the technology priority database (FIG. 15) based on the technology priority and the points of the priority determining factors thus calculated.

Figure 22:
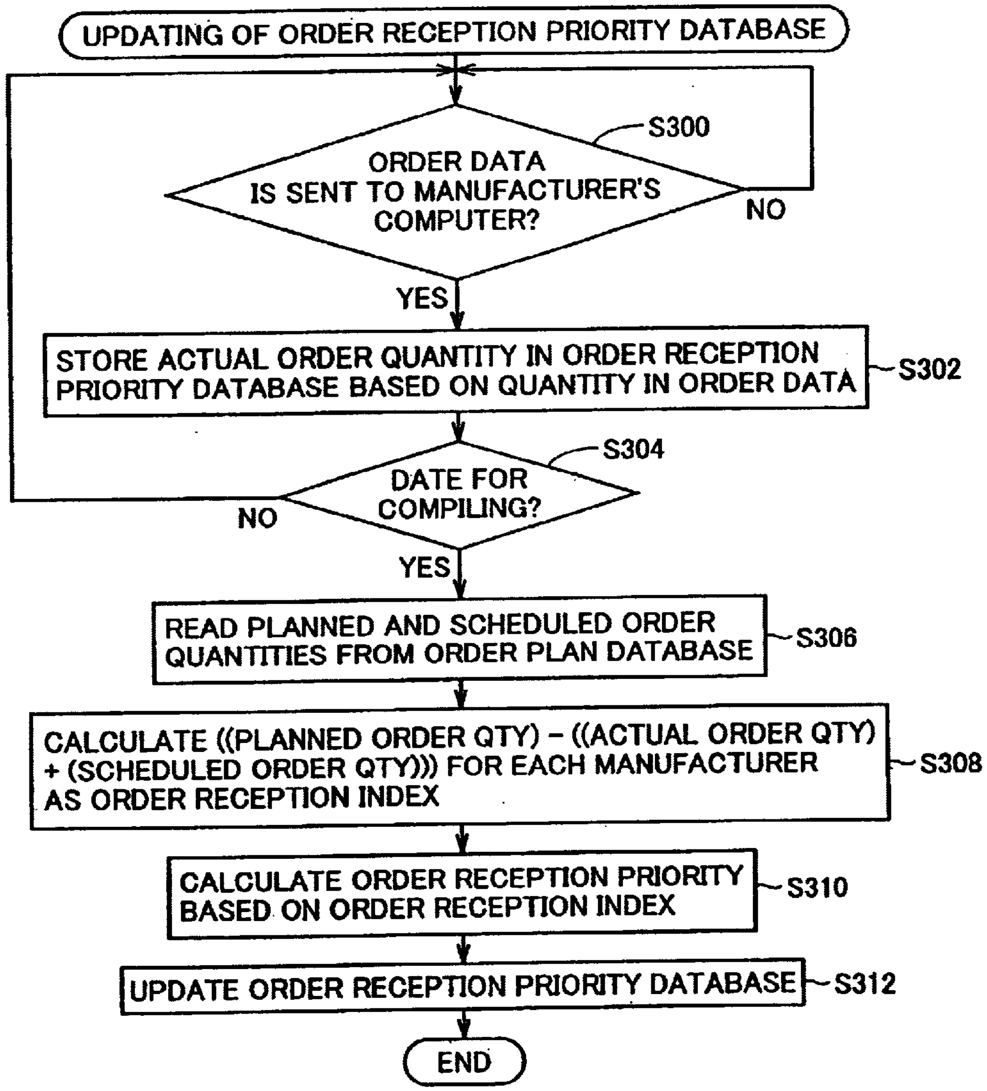
FIG. 22 is a flowchart showing processing of updating database of order reception priorities in the embodiment of the invention.

Referring to FIG. 22, the program executed by server 100 has the following control structure for the processing of updating the order reception priority database.

In S300, CPU 120 determines whether the order data (FIG. 11) is sent to manufacturer's computer 200 or not. If the order data is sent to manufacturer's computer 200 (YES in S300), the processing moves to S302. If not (NO in S300), the processing moves to S300 for waiting for the sending of order data to manufacturer's computer 200.

In S302, CPU 120 stores the actual order quantity included in the order reception priority database (FIG. 16) based on the order quantity included in the order data (FIG. 11). In S304, CPU 120 determines whether the current date and time have arrived at the date and time for compiling the order reception priority database or not. If arrived at the date and time for compiling (YES in S304), the processing moves to S306. If not (NO in S304), the processing returns to S300 for storing the actual order quantity in the order reception priority database (FIG. 16) every time the order data is sent to manufacturer's computer 200.

In S306, CPU 120 reads out the planned order quantity and the scheduled order quantity from the order plan database (FIG. 16). In S308, CPU 120 calculates ((planned order quantity)−((actual order quantity)+(scheduled order quantity))) for each photomask manufacturer based on the planned order quantity and the scheduled order quantity thus read as well as the actual order quantity stored in the order reception priority database (FIG. 16). In S310, CPU 120 calculates the order reception priority based on the results of calculation. In S312, CPU 120 updates the order reception priority database (FIG. 16) based on the calculated order reception priority.

Figure 23:
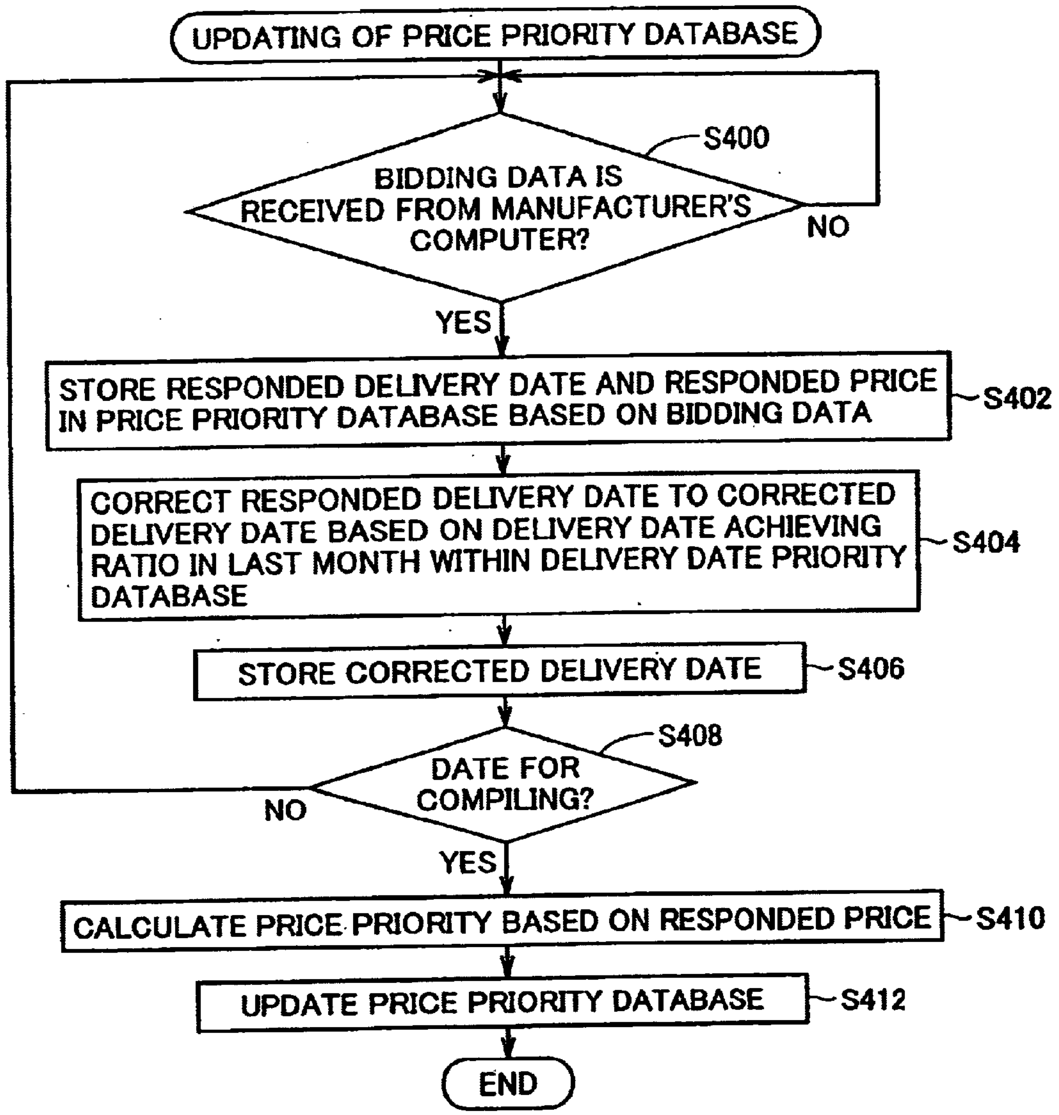
FIG. 23 is a flowchart showing processing of updating database of price priorities in the embodiment of the invention.

Referring to FIG. 23, the program executed by server 100 has the following control structure for the processing of updating the price priority database.

In S400, CPU 120 determines whether the bidding data (FIG. 10) is received from manufacturer's computer 200 or not. If the bidding data is received from manufacturer's computer 200 (YES in S400), the processing moves to S402. If not (NO in S400), the processing returns to S400 for waiting for the reception of bidding data from manufacturer's computer 200.

In S402, CPU 120 stores the responded delivery date and the responded price in the price priority database (FIG. 17) based on the received bidding data. In S404, CPU 120 corrects the responded delivery date in the price priority database (FIG. 17) to the corrected delivery date based on the delivery date achieving ratio in the last month within the delivery date priority database (FIG. 14). In S406, CPU 120 stores the corrected delivery date in the price priority database (FIG. 17).

In S408, CPU 120 determines whether the current date and time have arrived at the date and time for compiling the price priority database or not. If arrived at the current date and time for compiling (YES in S408), the processing moves to S410. If not (NO in S408), the processing returns to S400 for waiting for storing of the responded delivery date and the corrected delivery date every time the bidding data is received from manufacturer's computer 200.

In S410, CPU 120 calculates the price priority based on the responded price stored in S402. In S412, CPU 120 updates the price priority database based on the price priority thus calculated.

Figure 24:
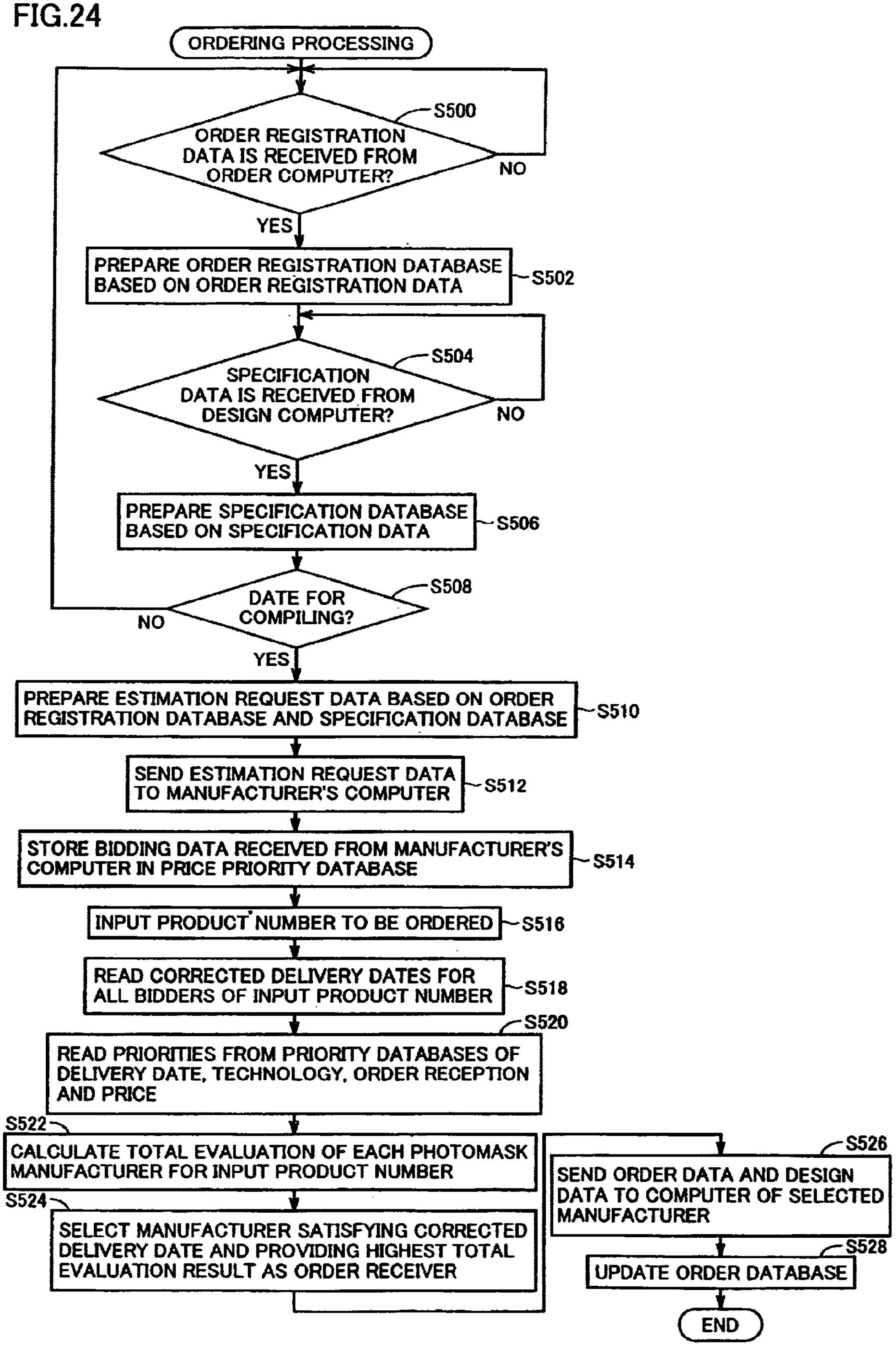
FIG. 24 is a flowchart showing ordering processing in the embodiment of the invention.

Referring to FIG. 24, the program executed by server 100 has the following control structure for the ordering processing.

In S500, CPU 120 determines whether the order registration data (FIG. 4) is received from order computer 300 or not. If the order registration data is received from order computer 300 (YES in S500), the processing moves to S502. If not (NO in S500), the processing returns to S500 for waiting for the reception of order registration data from order computer 300.

In S502, CPU 120 prepares the order registration database (FIG. 12) based on the order registration data.

In S504, CPU 120 determines whether the specification data (FIG. 5) is received from design computer 400 or not. If the specification data is received from design computer 400 (YES in S504), the processing moves to S506. If not (NO in S504), the processing returns to S504 for waiting for the reception of specification data from design computer 400.

In S506, CPU 120 prepares the specification database (FIG. 13) based on the received specification data. In S508, CPU 120 determines whether the current date and time have arrived at the date and time for requesting the estimation or not. The estimation requesting date and time are stored in advance in server 100. When the current date and time have arrived at the estimation request date and time (YES in S508), the processing moves to S510. If not (NO in S508), the processing returns to S500.

In S510, CPU 120 prepares the estimation request data (FIG. 6) based on the order registration database (FIG. 12) and the specification database (FIG. 13).

In S512, CPU 120 sends the estimation request data thus prepared to manufacturer's computer 200. In S514, CPU 120 updates the price priority database (FIG. 17) based on the responded delivery date and the responded price in the bidding data (FIG. 10) received from manufacturer's computer 200. Subsequently to the processing in S514, CPU 120 finishes the reception of the bidding data from manufacturer's computer 200 when a predetermined time elapses after the processing in S510.

In S516, CPU 120 detects that the product number of the photomask to be ordered is input. In S518, CPU 120 reads out the corrected delivery dates from the price priority database (FIG. 17) for all the photomask manufacturers, that submitted the bids for the input product number.

In S520, CPU 120 reads out the respective priorities from the delivery date priority database (FIG. 14), the technology priority database (FIG. 15), the order reception priority database (FIG. 16) and the price priority database (FIG. 17).

In S522, CPU 120 calculates the total evaluation of the photomask manufacturers, which submitted the bit for the input product number, based on the delivery date priority, technology priority, order reception priority and price priority. The calculated total evaluation is stored in the total evaluation database (FIG. 18).

In S524, CPU 120 selects, as the order receiver, the photomask manufacturer, which satisfies such conditions for the input product number that the corrected delivery date included in the price priority database (FIG. 17) satisfies the requested delivery date, and the highest total evaluation is obtained.

In S526, CPU 120 sends the order data (FIG. 11) and the design data (FIG. 7) to computer 200 of the selected photomask manufacturer. In S528, CPU 120 updates the order database (FIG. 19).

Based on the above structures and flowcharts, server 100 operates as follows.

[Operation of Updating Delivery Date Priority Database]

The photomask manufacturer produces the photomask based on the order data sent from server 100. When the photomask manufacturer delivers the photomask produced thereby, manufacturer's computer 200 sends the delivery data (FIG. 9) to server 100. Server 100 receives the delivery data (YES in S100), and updates the delivery date priority database (FIG. 14) based on the received delivery data (S102).

When the date and time for compiling the delivery date priority database arrive (YES in S104), the delivery date achieving ratio in the last month is calculated for each product number and each photomask manufacturer. Based on the calculated delivery date achieving ratio, the delivery priorities are calculated for each product number and each photomask manufacturer. The delivery date achieving ratio and the delivery priority thus calculated are stored in the delivery date priority database shown in FIG. 14 (S110).

[Operation of Updating Technology Priority Database]

A new photomask manufacturer sends the manufacturer data (FIG. 8) to server 100 before sending the bidding data. The photomask manufacturer already registered sends the manufacturer data (FIG. 8) to server 100, for example, when the manufacturer increased the number of manufacturing devices. Server 100 receives the manufacturer data (YES in S200), and updates the technology priority database (FIG. 15) based on the received manufacturer data (S202). When the date and time for compiling the technology priority database arrive (YES in S204), points of the priority determining factors are calculated for each of the photomask manufacturers (S206). The calculated points are added, and the technology priority is calculated for each photomask manufacturer (S208). The points of the priority determining factors and the technology priority thus calculated are stored in the technology priority database shown in FIG. 15 (S210).

[Operation of Updating Order Reception Priority Database]

When server 100 sends the order data (FIG. 11) to manufacturer's computer 200 (YES in S300), the actual order quantity in the order reception priority database (FIG. 16) is stored based on the order quantity included in the order data thus sent. When the date and time for compiling the order reception priority database arrive (YES in S304), the planned order quantity and the scheduled order quantity are read out from the order plan database (S306).

Based on the planned order quantity and the scheduled order quantity thus read, ((planned order quantity)−((actual order quantity)+(scheduled order quantity))) is calculated for each photomask manufacturer (S308). Based on the calculated results, the order reception priority is calculated (S310). The order reception priority thus calculated is stored in the order reception priority database in FIG. 16 (S312).

[Operation of Updating Price Priority Database]

The photomask manufacturer, that has received the estimation request data from server 100, sends the bidding data including the responded delivery date and the responded price to server 100. When server 100 receives the bidding data (YES in S400), it stores the responded delivery date and the responded price in the price priority database (FIG. 17) based on the received bidding data (S402).

The responded delivery date is corrected to the corrected delivery date based on the delivery date achieving ratio in the last month stored in delivery date priority database showing in FIG. 14 (S404), and the corrected delivery date is stored in the price priority database shown in FIG. 17 (S406). When the date and time for compiling the price priority database arrive (YES in S408), the price priority is calculated based on the responded price (S410). The calculated price priority is stored in the price priority database shown in FIG. 17 (S412).

[Ordering Operation]

When the photomask orderer finally determines the order specifications, the orderer sends the specification data (FIG. 5) from design computer 400 to server 100, and sends the order registration data (FIG. 4) from order computer 300 to server 100. When server 100 receives the order registration data from order computer 300 (YES in S500), the order registration database (FIG. 12) is prepared based on the order registration data (S502). When server 100 receives the specification data (FIG. 5) from design computer 400 (YES in S504), the specification database (FIG. 13) is prepared based on the received specification data (S506).

When the date and time for requesting the estimation arrive (YES in S508), the estimation request data (FIG. 6) is prepared based on the order registration database shown in FIG. 12 and the specification database shown in FIG. 13 (S510). The estimation request data thus prepared is sent to manufacturer's computer 200 (S512), and manufacturer's computer 200 receiving the estimation request data sends the bidding data including the responded delivery date and the responded price to server 100.

Server 100 receives the bidding data from photomask manufacturer's computer 200, and stores the received bidding data in the price priority database shown in FIG. 10 (S514). When the bidding is finished and the product number for order is input (S516), the corrected delivery date for the photomask manufacturer, that has made a bid for the input product number, is read out from the price priority database shown in FIG. 10 (S518). The respective priorities are read from the delivery date priority database (FIG. 14), technology priority database (FIG. 15), order reception priority database (FIG. 16) and price priority database shown in FIG. 17 (S520). The total evaluation is calculated for the manufacturers, that have a bid for the input product number (S522). The photomask manufacturer, that satisfies the corrected delivery date thus read, and exhibits the highest result of the total evaluation, is selected as the receiver of the order (S524).

Referring to FIGS. 17 and 18, the four photomask manufacturers made the bid for the product number "M1S". The corrected delivery dates thereof are shown in FIG. 17. For the photomask manufacturer "X", the corrected delivery date is Apr. 1, 2001, and the requested delivery date is Mar. 30, 2001. Thus, the corrected delivery date does not satisfy the requested delivery date. Therefore, the order data for the product number "M1S" is not sent to the photomask manufacturer "X". Among the other three photomask manufacturers, the photomask manufacturer "Y" provides the highest result of total evaluation. The corrected delivery date of the photomask manufacturer "Y" satisfies the requested delivery date. Therefore, the photomask manufacturer "Y" is selected as the receiver of order for the product number "M1S".

The order data (FIG. 11) and the design data (FIG. 7) are sent to computer 200 of the selected photomask manufacturer (S524), and the order database (FIG. 19) is updated (S526).

It has been described that the delivery date priority is set to be equal to the delivery date achieving ratio. The setting is not restricted to this. For example, the delivery date achieving ratio may be set as a function of the delivery date achieving ratio, or may be set independently of the delivery date achieving ratio.

In the manner described above, the photomask manufacturer selecting system of this embodiment calculates the delivery date priority for each photomask manufacturer based on the delivery date achieving ratio in the last month. This system calculates the technology priority for each photomask manufacturer based on the manufacturer data. This system calculates the order reception priority, which increases as the sum of the actual order quantity and the scheduled order quantity decreases below the planned order quantity, for each photomask manufacturer. This system calculates the price priority, which increases with decrease of the responded price sent from the photomask manufacturer's computer. This system calculates the corrected delivery date from the responded delivery date received from the manufacturer's computer based on the delivery date achieving ratio in the last month. This system selects, as the order receiver of the photomask, the photomask manufacturer satisfying such conditions that the corrected delivery date satisfies the request delivery date, and providing the highest result of total evaluation, which is made by totally determining the delivery date priority, technology priority, order reception priority and price priority. As a result, the photomask manufacturer can be easily selected based on the plurality of factors for placing an order for the photomask.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A selecting device for selecting a manufacturer of a photomask, comprising:

a communication circuit that communicates with a computer of a manufacturer of said photomask;

a storage circuit that stores data; and a control circuit connected to said communication circuit and said storage circuit that controls said communication circuit and said storage circuit, wherein said control circuit includes a circuit that sends specification data including specifications of said photomask and a requested delivery date to said computer, and said manufacturer receiving said specification data prepares estimation data including a scheduled delivery date of said photomask based on said specifications and said requested delivery date, and sends said prepared estimation data to said selecting device by said computer, and said control circuit further includes:

a circuit that receives said estimation data and stores the same in said storage circuit, a circuit that stores delivery data representing results of delivery of the photomasks by said manufacturer in said storage circuit, a circuit that corrects said scheduled delivery date based on said scheduled delivery date and said results, and stores the corrected delivery date in said storage circuit, and a select circuit that selects the manufacturer of said photomask based on said requested delivery date and said corrected delivery date.

2. The selecting device according to claim 1, wherein said select circuit includes a circuit that selects a plurality of manufacturers for manufacturing said photomask, and said control circuit further includes:

a circuit that calculates a priority for the delivery date for each of said manufacturers based on said delivery date, and a circuit that selects the manufacturer of said photomask from the plurality of manufacturers selected by said select circuit based on said priority relating to the delivery date.

3. The selecting device according to claim 1, wherein said select circuit includes a circuit that selects a plurality of manufacturers for manufacturing said photomask, and said control circuit further includes:

a circuit that receives technology data representing a technology of said manufacturer relating to manufacturing of said photomask from said computer, and stores said technology data in said storage circuit, a circuit that calculates a priority relating to the technology for each of said manufacturers based on said technology data, and a circuit that selects the manufacturer of said photomask from the plurality of manufacturers selected by said select circuit based on said priority relating to the technology.

4. The selecting device according to claim 1, wherein said select circuit includes a circuit that selects a plurality of manufacturers for manufacturing said photomask, and said control circuit further includes:

a circuit that stores data representing an order plan of said photomask to be ordered to said manufacturer and data representing a result of order in said storage circuit, a circuit that calculates a priority for plan achievement for each of said manufacturers based on said data representing the order plan and said data representing the result of order, said priority for plan achievement increasing with decrease in degree of achievement of said order plan by said result of order, and a circuit that selects the manufacturer of said photomask from the plurality of manufacturers selected by said select circuit based on said priority relating to the plan achievement.

5. The selecting device according to claim 1, wherein said estimation data further includes an estimated price of said photomask, said select circuit includes a circuit that selects a plurality of manufacturers for manufacturing said photomask, and said control circuit further includes:

a circuit that calculates a priority relating to the price for each of said manufacturers based on said estimated price, and a circuit that selects the manufacturer of said photomask from the plurality of manufacturers selected by said select circuit based on said priority relating to the price.

6. The selecting device according to claim 1, wherein said select circuit includes a circuit that selects a plurality of manufacturers for manufacturing said photomasks, said estimation data further includes an estimated price of said photomask, and said control circuit further includes:

a circuit that calculates a priority relating to the delivery date for each of said manufacturers based on said delivery data, a circuit that receives technology data representing a technology of said manufacturer relating to production of said photomask from said computer, and stores the received technology data in said storage circuit, a circuit that calculates a priority relating to the technology for each of said manufacturers based on said technology data, a circuit that stores data representing an order plan of said photomask to be ordered to said manufacturer and data representing a result of order in said storage circuit, a circuit that calculates a priority for plan achievement for each of said manufacturers based on said data representing the order plan and said data representing the result of order, said priority for plan achievement increasing with decrease in degree of achievement of said order plan by said result of order, a circuit that calculates a priority relating to the price for each of said manufacturers based on said estimated price, and a circuit that selects the manufacturer of the photomask from the plurality of manufacturers selected by said select circuit based on the priority relating to said delivery date, the priority relating to said technology, the priority for said plan achievement and the priority relating to said price.

7. A selecting device for selecting a manufacturer of a photomask, comprising:

communication means for communication with a computer of a manufacturer of said photomask;

storage means for storing data; and control means connected to said communication means and said storage means for controlling said communication means and said storage means, wherein said control means includes means for sending specification data including specifications of said photomask and a requested delivery date to said computer, and said manufacturer receiving said specification data prepares estimation data including a scheduled delivery date of said photomask based on said specifications and said requested delivery date, and sends said prepared estimation data to said selecting device by said computer, and said control means further includes:

means for receiving said estimation data and storing the same in said storage means, means for storing delivery data representing results of delivery of the photomasks by said manufacturer in said storage means, means for correcting said scheduled delivery date based on said scheduled delivery date and said results, and storing the corrected delivery date in said storage means, and select means for selecting the manufacturer of said photomask based on said requested delivery date and said corrected delivery date.

8. The selecting device according to claim 7, wherein said select means includes means for selecting a plurality of manufacturers for manufacturing said photomask, and said control means further includes:

means for calculating a priority for the delivery date for each of said manufacturers based on said delivery date, and means for selecting the manufacturer of said photomask from the plurality of manufacturers selected by said select means based on said priority relating to the delivery date.

9. The selecting device according to claim 7, wherein said select means includes means for selecting a plurality of manufacturers for manufacturing said photomask, and said control means further includes:

means for receiving technology data representing a technology of said manufacturer relating to manufacturing of said photomask from said computer, and storing said technology data in said storage means, means for calculating a priority relating to the technology for each of said manufacturers based on said technology data, and means for selecting the manufacturer of said photomask from the plurality of manufacturers selected by said select means based on said priority relating to the technology.

10. The selecting device according to claim 7, wherein said select means includes means for selecting a plurality of manufacturers for manufacturing said photomask, and said control means further includes:

means for storing data representing an order plan of said photomask to be ordered to said manufacturer and data representing a result of order in said storage means, means for calculating a priority for plan achievement for each of said manufacturers based on said data representing the order plan and said data representing the result of order, said priority for plan achievement increasing with decrease in degree of achievement of said order plan by said result of order, and means for selecting the manufacturer of said photomask from the plurality of manufacturers selected by said select means based on said priority relating to the plan achievement.

11. The selecting device according to claim 7, wherein said estimation data further includes an estimated price of said photomask, said select means includes means for selecting a plurality of manufacturers for manufacturing said photomask, and said control means further includes:

means for calculating a priority relating to the price for each of said manufacturers based on said estimated price, and means for selecting the manufacturer of said photomask from the plurality of manufacturers selected by said select means based on said priority relating to the price.

12. The selecting device according to claim 7, wherein said select means includes means for selecting a plurality of manufacturers for manufacturing said photomasks, said estimation data further includes an estimated price of said photomask, and said control means further includes:

means for calculating a priority relating to the delivery date for each of said manufacturers based on said delivery data, means for receiving technology data representing a technology of said manufacturer relating to production of said photomask from said computer, and storing the received technology data in said storage means, means for calculating a priority relating to the technology for each of said manufacturers based on said technology data, means for storing data representing an order plan of said photomask to be ordered to said manufacturer and data representing a result of order in said storage means, means for calculating a priority for plan achievement for each of said manufacturers based on said data representing the order plan and said data representing the result of order, said priority for plan achievement increasing with decrease in degree of achievement of said order plan by said result of order, means for calculating a priority relating to the price for each of said manufacturers based on said estimated price, and means for selecting the manufacturer of the photomask from the plurality of manufacturers selected by said select means based on the priority relating to said delivery date, the priority relating to said technology, the priority for said plan achievement and the priority relating to said price.

13. A selecting method for selecting a manufacturer of a photomask comprising the steps of:

sending specification data including specifications of said photomask and a requested delivery date to a computer of said manufacturer, said manufacturer receiving said specification data, preparing estimation data including a scheduled delivery date of said photomask based on said specifications and said requested delivery date, and sending said prepared estimation data by the computer of said manufacturer;

receiving and storing said estimation data;

preparing delivery data representing results of delivery of the photomask by said manufacturer;

correcting said scheduled delivery data based on the scheduled delivery data and said result, and storing the corrected delivery data; and selecting the manufacturer of said photomask based on said requested delivery date and said corrected delivery date.

14. The selecting method according to claim 13, wherein said step of selecting the manufacturer includes the step of selecting a plurality of manufacturers for manufacturing said photomask, and said selecting method further comprises the steps of:

calculating a priority for the delivery date for each of said manufacturers based on said delivery date, and selecting the manufacturer of said photomask from the plurality of manufacturers selected by said step of selecting the plurality of manufacturers of said photomask based on said priority relating to the delivery date.

15. The selecting method according to claim 13, wherein said step of selecting the manufacturer includes the step of selecting a plurality of manufacturers for manufacturing said photomask, and said selecting method further comprises the steps of:

preparing technology data representing a technology of said manufacturer relating to manufacturing of said photomask, calculating a priority relating to the technology for each of said manufacturers based on said technology data, and selecting the manufacturer of said photomask from the plurality of manufacturers by said step of selecting the plurality of manufacturers of said photomask based on said priority relating to the technology.

16. The selecting method according to claim 13, wherein said step of selecting the manufacturer includes the step of selecting a plurality of manufacturers for manufacturing said photomask, and said selecting method further comprises the steps of:

preparing data representing an order plan of said photomask to be ordered to said manufacturer and data representing a result of order, calculating a priority for plan achievement for each of said manufacturers based on said data representing the order plan and said data representing the result of order, said priority for plan achievement increasing with decrease in degree of achievement of said order plan by said result of order, and selecting the manufacturer of said photomask from the plurality of manufacturers by said step of selecting the plurality of manufacturers of said photomask based on said priority relating to the plan achievement.

17. The selecting method according to claim 13, wherein said estimation data further includes an estimated price of said photomask, said selecting step includes the step of selecting a plurality of manufacturers for manufacturing said photomask, and said selecting method further comprises the steps of:

calculating a priority relating to the price for each of said manufacturers based on said estimated price, and selecting the manufacturer of said photomask from the plurality of manufacturers by said step of selecting the plurality of manufacturers of said photomask based on said priority relating to the price.

18. The selecting method according to claim 13, wherein said selecting step includes the step of selecting a plurality of manufacturers for manufacturing said photomasks, said estimation data further includes an estimated price of said photomask, and said selecting method further comprises the steps of:

calculating a priority relating to the delivery date for each of said manufacturers based on said delivery data, preparing technology data representing a technology of said manufacturer relating to production of said photomask, calculating a priority relating to the technology for each of said manufacturers based on said technology data, preparing data representing an order plan of said photomask to be ordered to said manufacturer and data representing a result of order, calculating a priority for plan achievement for each of said manufacturers based on said data representing the order plan and said data representing the result of order, said priority for plan achievement increasing with decrease in degree of achievement of said order plan by said result of order, calculating a priority relating to the price for each of said manufacturers based on said estimated price, and selecting the manufacturer of the photomask from the plurality of manufacturers selected by said step of selecting the plurality of manufacturers of said photomask based on the priority relating to said delivery date, the priority relating to said technology, the priority for said plan achievement and the priority relating to said price.

* * * * *